US011067593B2

(12) United States Patent
Jackson

(10) Patent No.: US 11,067,593 B2
(45) Date of Patent: Jul. 20, 2021

(54) PITOT STATIC SYSTEMS WITH ANGLE OF SIDESLIP DETERMINATION AND COMPENSATION

(71) Applicant: Rosemount Aerospace Inc., Burnsville, MN (US)

(72) Inventor: Darren G. Jackson, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 364 days.

(21) Appl. No.: 16/041,486

(22) Filed: Jul. 20, 2018

(65) Prior Publication Data
US 2020/0025787 A1  Jan. 23, 2020

(51) Int. Cl.
| *G01P 5/165* | (2006.01) |
| *G01C 5/06* | (2006.01) |
| *G01P 13/02* | (2006.01) |
| *G01P 5/16* | (2006.01) |
| *B64D 43/02* | (2006.01) |

(52) U.S. Cl.
CPC ............. *G01P 5/165* (2013.01); *G01C 5/06* (2013.01); *G01P 13/025* (2013.01)

(58) Field of Classification Search
CPC .......... G01P 5/165; G01P 13/025; G01P 5/16; G01P 5/14; G01C 5/06; B64D 43/02; G01M 9/06
See application file for complete search history.

(56) References Cited

U.S. PATENT DOCUMENTS

| 3,318,146 | A | * | 5/1967 | Hagen | ................... B64D 43/00 73/180 |
| 5,616,861 | A | * | 4/1997 | Hagen | ...................... G01P 5/14 73/170.02 |
| 6,561,020 | B2 | | 5/2003 | Glenney | |
| 6,604,029 | B2 | | 8/2003 | Cronin et al. | |
| 6,609,421 | B2 | | 8/2003 | Cronin et al. | |
| 6,761,057 | B2 | | 7/2004 | Cronin et al. | |
| 8,104,339 | B2 | | 1/2012 | Elgersma | |
| 8,857,255 | B2 | | 10/2014 | Anderson et al. | |
| 9,842,439 | B2 | | 12/2017 | Cadotte et al. | |

FOREIGN PATENT DOCUMENTS

EP  1255118 A1  11/2002

OTHER PUBLICATIONS

Extended European search report issued in corresponding EP Application No. 19187434.6, dated Dec. 4, 2019.

* cited by examiner

*Primary Examiner* — Peter J Macchiarolo
*Assistant Examiner* — Anthony W Megna Fuentes
(74) *Attorney, Agent, or Firm* — Locke Lord LLP; Daniel J. Fiorello; Georgi Korobanov

(57) ABSTRACT

An air data probe system can include a pitot static system configured to sense at least one total pressure value of a flow at one or more locations, at least one static pressure value of the flow at the one or more locations, and, directly or indirectly, at least one differential static pressure value of the flow at the one or more locations. The system can include an angle of slip (AOS) module configured to determine a local angle of slip (LAOS) value at each location based on the at least one total pressure value at each location, the at least one static pressure value at each location, and the at least one differential static pressure value at each location.

18 Claims, 8 Drawing Sheets

PITOT STATIC SYSTEMS WITH ANGLE OF SIDESLIP DETERMINATION AND COMPENSATION

BACKGROUND

1. Field

The present disclosure relates to aircraft pitot static systems.

2. Description of Related Art

Current aircraft regulations describe a certifiable pitot-static system as one in which there is two "independent" systems capable of sideslip compensation. Each system includes at least two air data probes, at least one on each side of the aircraft. Therefore, to achieve this, typical aircraft architectures include at least two air data probes on each side of the aircraft to measure various parameters such as static/total pressure and angle of attack, and perform sideslip compensation to achieve the necessary independence and accuracy requirements. In most cases, sideslip compensation is done through pneumatic or digital averaging of data from probes mounted on opposite sides of the aircraft.

Such conventional methods and systems have generally been considered satisfactory for their intended purpose. However, there is still a need in the art for improved pitot static systems. The present disclosure provides a solution for this need.

SUMMARY

An air data probe system can include a pilot static system configured to sense at least one total pressure value of a flow at one or more locations, at least one static pressure value of the flow at the one or more locations, and, directly or indirectly, at least one differential static pressure value of the flow at the one or more locations. The system can include an angle of slip (AOS) module configured to determine a local angle of slip (LAOS) value at each location based on the at least one total pressure value at each location, the at least one static pressure value at each location, and the at least one differential static pressure value at each location.

The AOS module can be configured to determine a local angle of attack (LAOA) value at each location based on the at least one differential pressure value at each location, or to receive an LAOA value from the pitot static system. The AOS module can be configured to determine the LAOS at each location based on a comparison of total pressure to static pressure ratio ($P_t/P_s$) against LAOA at a given speed, altitude, and temperature.

The AOS module can be configured to plot $P_t/P_s$ against LAOA and determine the LAOS value based on stored LAOS correlation data for the location. The AOS module can be configured to determine an aircraft angle of slip (AAOS) based on the determined LAOS using stored AAOS correlation data. In certain embodiments, the AOS module is configured to find a point on a correlation surface plot corresponding to the determined LAOS and the AAOA to determine the AAOS. In certain embodiments, the AOS module can be configured to determine an aircraft angle of attack (AAOA) based on the determined LAOA using stored AAOA correlation data.

In certain embodiments, the AOS module is configured to determine the LAOS by receiving the at least one total pressure value and the at least one static pressure value from the pitot static system at each location, receiving the at least one differential static pressure value the flow from the pitot static system at each location or deriving the at least one differential static pressure value from a plurality of static pressure values from the pitot static system at each location, determining a local angle of attack (LAOA) value at each location based on the at least one differential static pressure value, and comparing total pressure to static pressure ratio ($P_t/P_s$) to the LAOA value to determine the LAOS value at each location based on stored LAOS correlation data for each location.

In certain embodiments, the pilot static systems can include a pitot tube having at least one total pressure port and at least two static pressure ports 180 degrees apart from each other to allow determination of differential pressure value to allow the system to determine a first local flow angle. The pitot tube can include at least two additional static pressure ports to allow determination of a second differential pressure value to allow the system to determine a second local flow angle. Any other suitable structure is contemplated herein. The AOS module can be configured to output the AAOS to an aircraft airspeed and/or altitude module configured to determine airspeed and/or altitude using the AAOS or to a correct a provided airspeed and/or altitude based on the AAOS.

A computer implemented method for determining an angle of slip can include receiving at least one total pressure and at least one static pressure value of a flow from a pitot static system at one or more locations, receiving at least one differential static pressure value of the flow at each location from the pitot static systems or deriving the differential static pressure from a plurality of static pressure values from the pitot static system at each location, determining a local angle of attack (LAOA) value at each location based on the at least one differential static pressure value, and comparing total pressure to static pressure ratio ($P_t/P_s$) to the LAOA value to determine a local angle of slip (LAOS) value at each location based on stored LAOS correlation data for each location. The method can include determining an aircraft angle of slip (AAOS) based on the determined LAOS value using stored AAOS correlation data.

In certain embodiments, the method can include determining an aircraft angle of attack (AAOA) based on the determined LAOA using stored AAOA correlation data. The method can include finding a point on a correlation surface plot corresponding to the determined LAOS and the AAOA to determine the AAOS. In certain embodiments, the method can include determining airspeed and/or altitude using the AAOS. In certain embodiments where an airspeed and/or altitude value is provided, the method can include correcting a provided airspeed and/or altitude based on the AAOS.

The method can include providing the determined airspeed and/or altitude to an air data computer of an aircraft. In certain embodiments, the method can include providing the corrected airspeed and/or altitude to an air data computer of an aircraft.

In accordance with at least one aspect of this disclosure, a non-transitory computer readable medium can include computer executable instructions, the instructions configured to cause a computer to perform a method. The method can include any suitable embodiment of a method and/or any suitable portion(s) thereof disclosed herein.

These and other features of the systems and methods of the subject disclosure become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
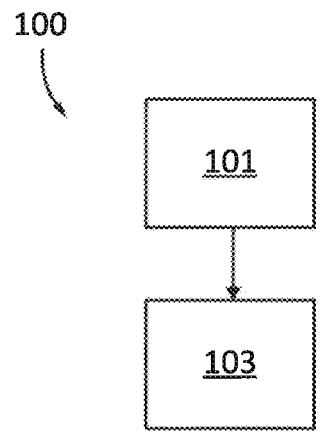
FIG. 1 is a schematic view of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A-5. The systems and methods described herein can be used to provide aircraft angle of slip and/or aircraft angle of attack using as little as a single pitot static probe, which can also be used to correct airspeed and altitude, for example.

Figure 2A:
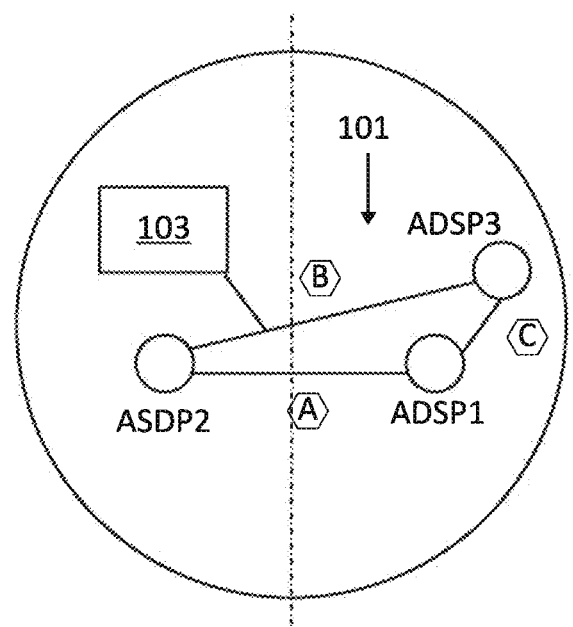
FIG. 2A is a schematic front view of an embodiment of an aircraft showing an embodiment of a plurality of locations of air data probes of an embodiment of a pitot static systems.
Figure 2B:
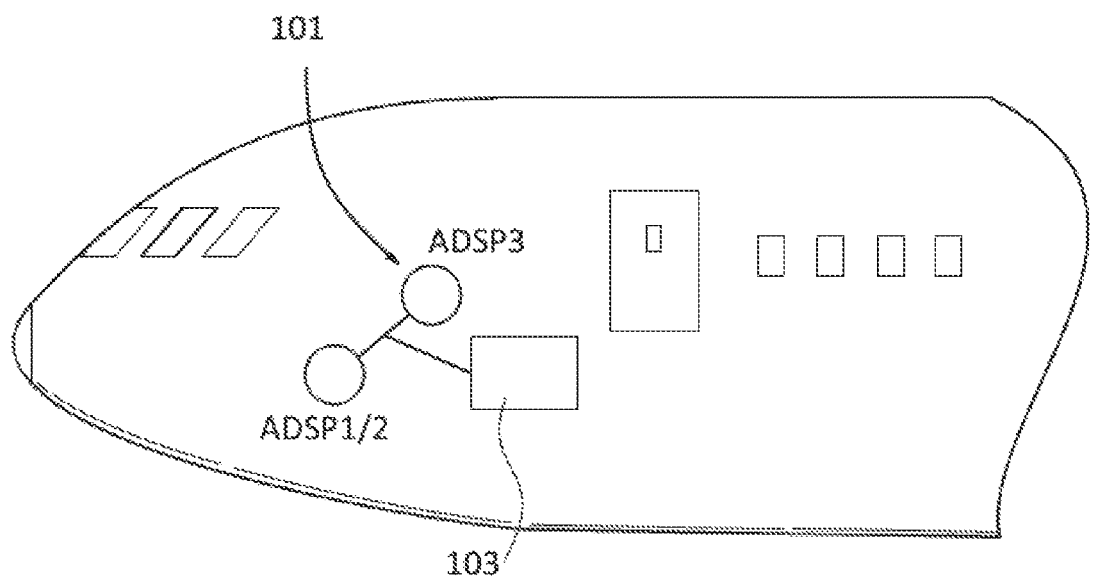
FIG. 2B is a side view of the embodiment of FIG. 2A.

Referring to FIGS. 1 and 2A-2C, an air data probe system 100 can include a pitot static system 101 configured to sense at least one total pressure value of a flow at one or more locations (e.g., locations ADSP 1, 2, and/or 3 as shown in FIGS. 2A and 2B). The pitot static system 101 can be configured to sense at least one static pressure value of the flow at the one or more locations. The pitot static system 101 can, directly or indirectly, sense at least one differential static pressure value of the flow at the one or more locations. For example, the pitot static system 101 can include a differential pressure sensor and/or a plurality of static pressure ports positioned to provide two opposing static pressure readings (e.g., static pressure ports 180 degrees apart from each other on a pitot tube) to allow indirect determination of the differential pressure value.

As shown in FIG. 1 (and schematically shown in FIGS. 2A and 2B), the system 100 can include an angle of slip (AOS) module 103 configured to determine a local angle of slip (LAOS) value at each location based on the at least one total pressure value at each location, the at least one static pressure value at each location, and the at least one differential static pressure value at each location. The AOS module 103 can be configured to determine a local angle of attack (LAOA) value at each location based on the at least one differential pressure value at each location, or to receive an LAOA value from the pitot static system 101. The AOS module 103 can be configured to determine the LAOS at each location based on a comparison of total pressure to static pressure ratio ($P_t/P_s$) against LAOA, e.g., at a given speed, altitude, and temperature.

Figure 3A:
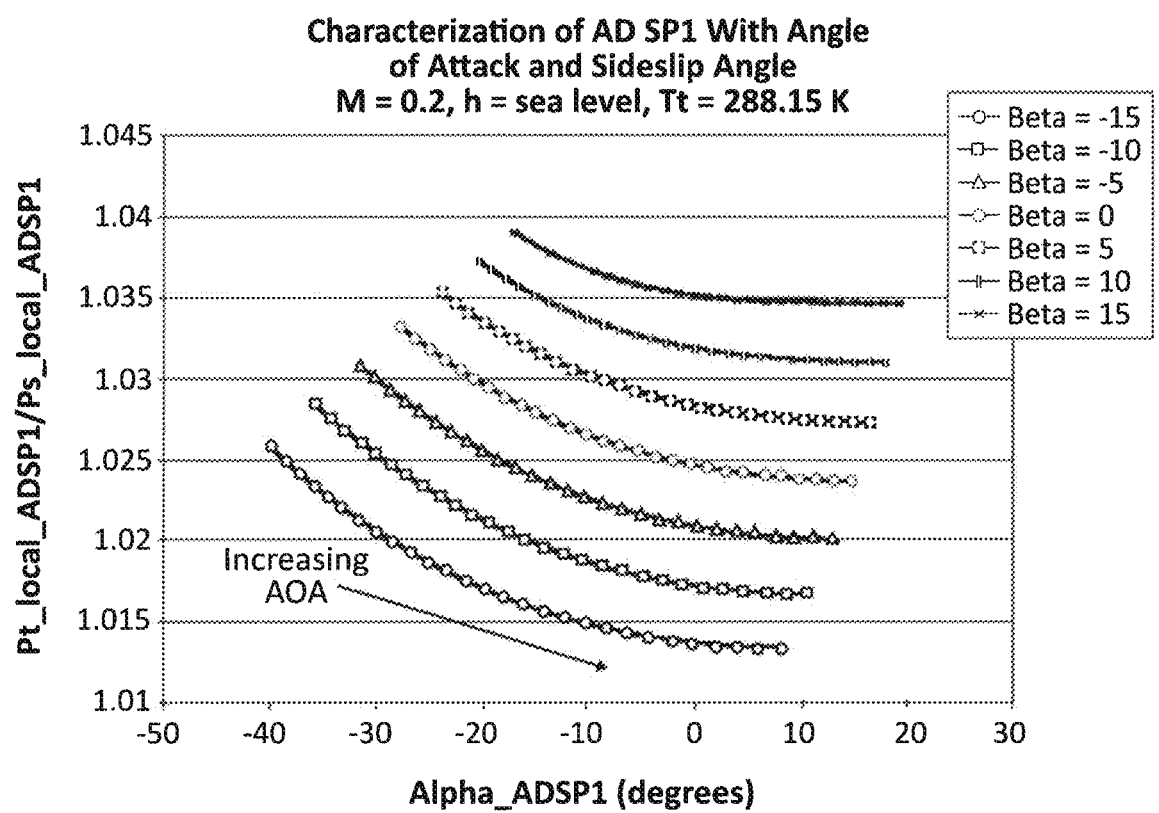
FIGS. 3A, 3B, and 3C are charts showing a relationship of total pressure to static pressure ratio ($P_t/P_s$; vertical axis) to local angle of attack (LAOA; x-axis; alpha), which is shown correlated to local angle of slip (LAOS; beta; stepped curves) at each location of air data probe of FIGS. 2A and 2B.
Figure 3B:
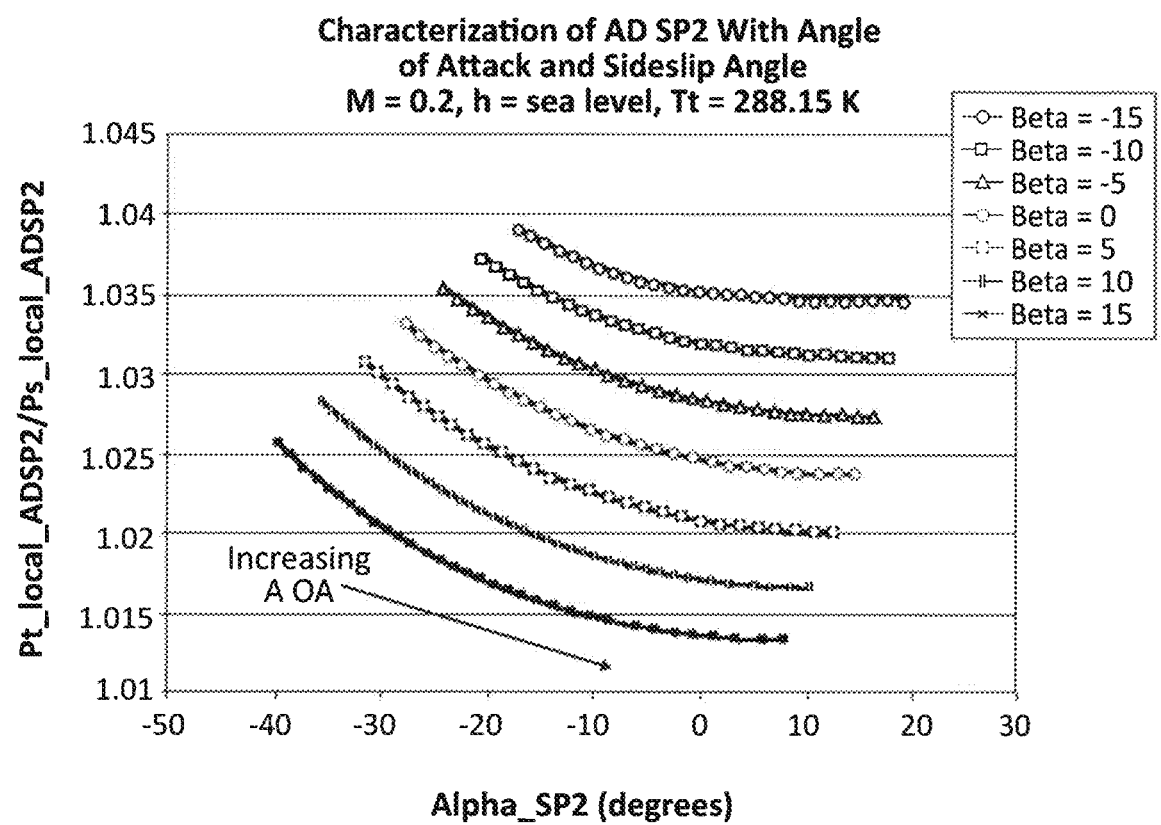
Figure 3C:
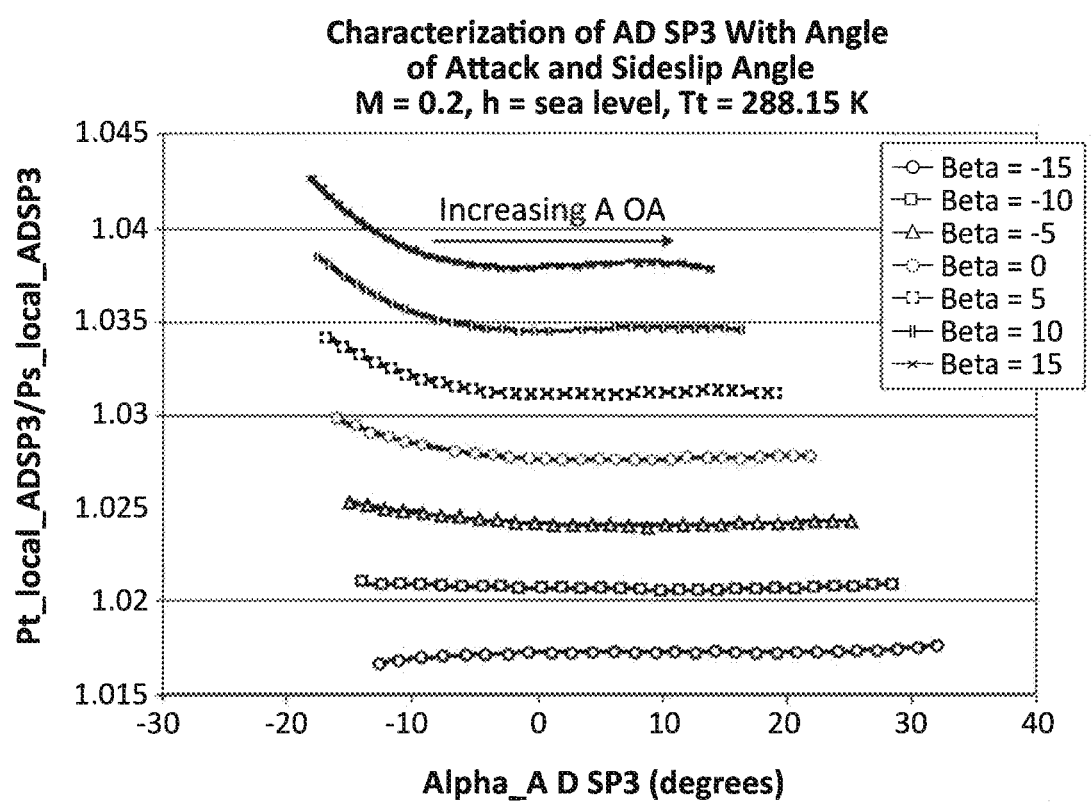

Referring additionally to FIGS. 3A-3C, the AOS module 103 can be configured to plot $P_t/P_s$ against LAOA and determine the LAOS value based on stored LAOS correlation data (e.g., determined by CFD or other suitable flow analysis for each location) for the location. FIGS. 3A, 3B, and 3C correspond to locations ADSP1, ADSP2, and ADSP3, respectively. Each chart shows $P_t/P_s$ (vertical LAOA (designated as Alpha_location). Overlaid on the chart are LAOS lines that indicate points that correlate to certain local angles of slip (shown as Beta in the legend). As shown, ADSP1 and ADSP2 show change along the beta curves in the increasing LAOA direction, whereas ADSP3 is relatively straight. This indicates that ADSP1 and ADSP2 can be used for reliable angle of attack slip and or angle of attack indications as a function of $P_t/P_s$. The shown data is calculated for a known speed (e.g., M=0.2), a known altitude (e.g., sea level), and a known temperature (e.g., 288.15 K).

As shown, it can be seen that there is a unique set of $P_t/P_s$ and Local AOA for every Aircraft AOA and AAOS. FIG. 3C, on the other hand, shows good sensitivity to AOS, but less variation with AOA. Thus, some locations on the aircraft may be preferred to others to provide the desired sensitivity/accuracy. Suitable locations can be determined without undue experimentation by one having ordinary skill in the art in view of this disclosure.

Figure 4A:
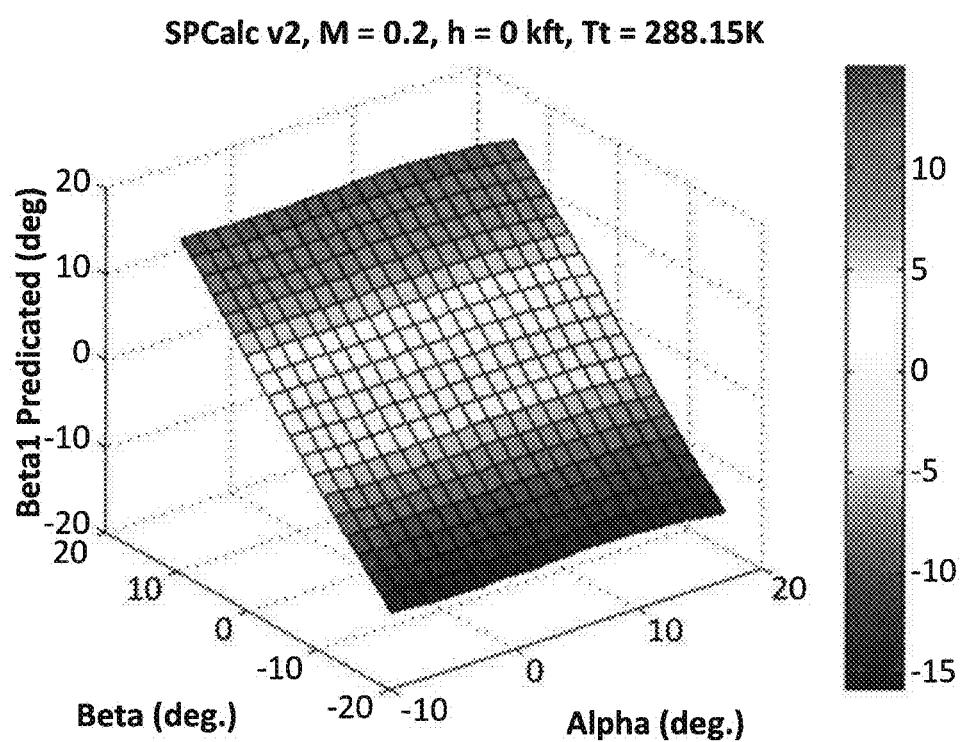
FIGS. 4A and 4B are 3D surface charts showing a relationship of predicted angle of slip (LAOS or AAOS; vertical axis; Beta 1 Predicted) to actual aircraft angle of slip (AAOS) (Beta axis) and actual aircraft angle of attack (AAOA) (Alpha axis) at different airspeeds and altitudes.
Figure 4B:
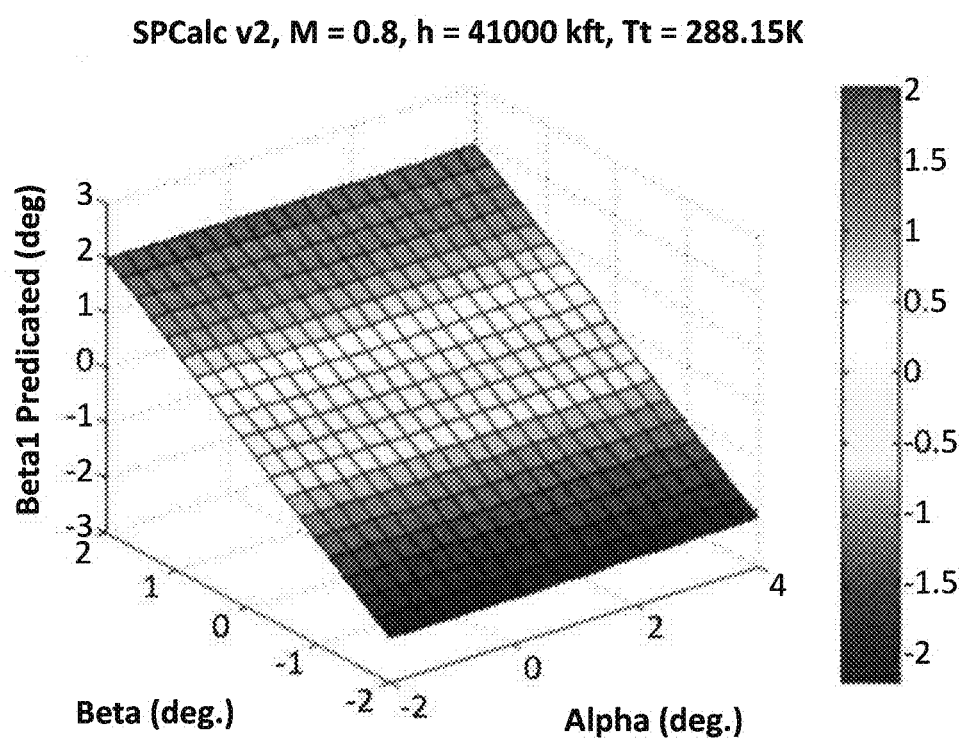

Referring additionally to FIGS. 4A-4B, the AOS module 103 can be configured to determine a predicted aircraft angle of slip (AAOS; predicted beta) based on the determined LAOS using stored AAOS correlation data (e.g., determined by CFD or other suitable flow analysis for each location). In certain embodiments, the AOS module 103 is configured to find a point on a correlation surface plot, e.g., as shown in FIGS. 4A and 4C, corresponding to the determined LAOS and the AAOA to determine the AAOS. In certain embodiments, the AOS module can be configured to determine an aircraft angle of attack (AAOA) based on the determined LAOA using stored AAOA correlation data (e.g., determined by CFD or other suitable flow analysis for each location). As shown, the known correlation data of FIGS. 4A and 4B can be for the same location (e.g., ADSP1) but at different airspeeds (e.g., M=0.2 vs. M=0.8) and different altitudes (e.g., sea level vs. 41,000 feet).

In certain embodiments, the AOS module 103 is configured to determine the LAOS by receiving the at least one total pressure value and the at least one static pressure value from the pitot static system 101 at each location. The AOS module 103 can be configured to receive the at least one differential static pressure value of the flow from the pitot static system 101 at each location or derive the at least one differential static pressure value from a plurality of static pressure values from the pitot static system at each location. The AOS module 103 can be configured to determine a local angle of attack (LAOA) value at each location based on the at least one differential static pressure value and compare total pressure to static pressure ratio ($P_t/P_s$) to the LAOA value to determine the LAOS value at each location based on stored LAOS correlation data for each location.

Figure 2C:
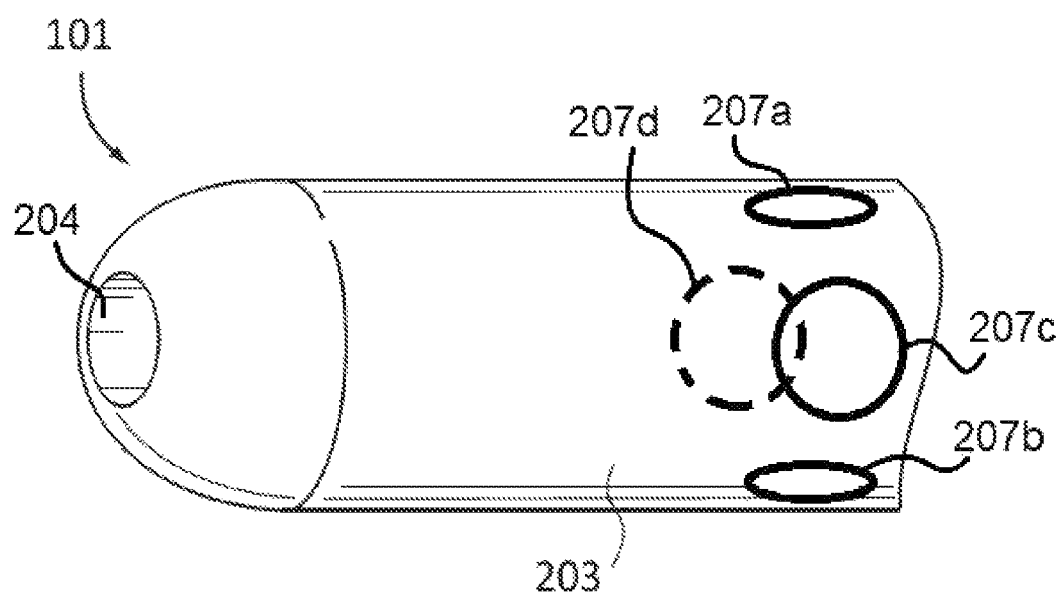
FIG. 2C is a schematic view of an embodiment of an air data probe in accordance with this disclosure.

In certain embodiments, as shown in FIG. 2C, the pitot static system 101 can include, e.g., at each location, a pitot tube 203 having at least one total pressure port 204 and at least two static pressure ports 207a, 207b that are disposed 180 degrees apart from each other to allow determination of differential pressure value, as appreciated by those having ordinary skill in the art in view of this disclosure. Such ports can be used to determine differential pressure to determine to allow the system to determine a first local flow angle (e.g., local angle of attack).

In certain embodiments, additional enhancement of angle of slip prediction can be provided by adding two more opposed ports in addition to the existing ports to allow determination of a second differential pressure value to allow the system to determine a second local flow angle (e.g., local angle of slip). For example, the pitot tube 203 can include two additional ports 207c, 207d located, e.g., 90 degrees from the ports 207a, 207b, such that a total of four static pressure ports are disposed in the pitot tube 203, each about 90 degrees apart from each other. Any other suitable structure is contemplated herein (e.g., more or less static or dynamic ports, different positioning of the static ports, etc.). One having ordinary skill in the art can use the beta (e.g., local slip) measurement from the additional ports to enhance the correlation between local parameters and the aircraft free stream parameters. For example, one having ordinary skill in the art could add a third axis to the graph of FIG. 3A to form a surface plot using the beta measurements, or one having ordinary skill in the art could create another correlation graph similar to that of FIG. 3A using the Pt/Ps vs. the beta measurement on the x-axis instead of alpha as shown.

The AOS module 103 can be configured to output the AAOS to an aircraft airspeed and/or altitude module configured to determine airspeed and/or altitude using the AAOS or to a correct a provided airspeed and/or altitude based on the AAOS. The AOS module 103 can also be configured to correct speed and/or altitude as a function of AAOA.

Figure 5:
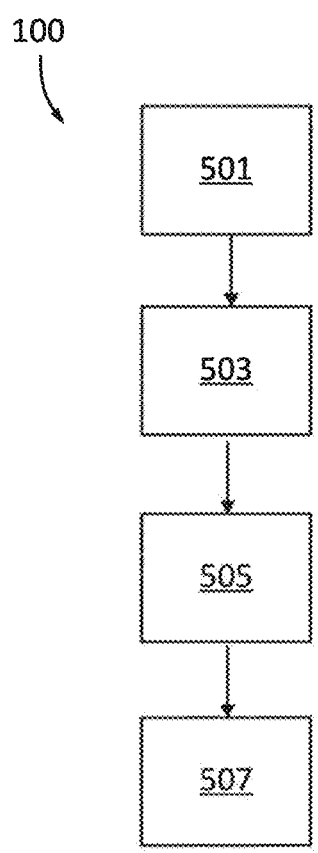
FIG. 5 is an embodiment of a computer implemented method in accordance with this disclosure.

Referring to FIG. 5, a computer implemented method 500 for determining an angle of slip can include receiving (e.g., at block 501) at least one total pressure and at least one static pressure value of a flow from a pitot static system at one or more locations, receiving (e.g., at block 503) at least one differential static pressure value of the flow at each location from the pitot static system or deriving the differential static pressure from a plurality of static pressure values from the pitot static system at each location, determining (e.g., at block 505) a local angle of attack (LAOA) value at each location based on the at least one differential static pressure value, and comparing (e.g., at block 507) total pressure to static pressure ratio ($P_t/P_s$) to the LAOA value to determine a local angle of slip (LAOS) value at each location based on stored LAOS correlation data for each location. The method 500 can include determining an aircraft angle of slip (AAOS) based on the determined LAOS value using stored AAOS correlation data.

In certain embodiments, the method 500 can include determining an aircraft angle of attack (AAOA) based on the determined LAOA using stored AAOA correlation data. The method 500 can include finding a point on a correlation surface plot corresponding to the determined LAOS and the AAOA to determine the AAOS.

In certain embodiments, the method 500 can include determining airspeed and/or altitude using the AAOS. In certain embodiments where an airspeed and/or altitude value is provided, the method 500 can include correcting a provided airspeed and/or altitude based on the AAOS. The method 500 can include providing the determined airspeed and/or altitude to an air data computer of an aircraft. In certain embodiments, the method 500 can include providing the corrected airspeed and/or altitude to an air data computer of an aircraft.

In accordance with at least one aspect of this disclosure, a non-transitory computer readable medium can include computer executable instructions, the instructions configured to cause a computer to perform a method. The method can include any suitable embodiment of a method and/or any suitable portion(s) thereof disclosed herein.

Embodiments can help to simplify the optimization process for the air data probes and other probes mounted on the nose of the aircraft where real estate is at a premium. Embodiments can also be used to improve the fidelity of reversionary schemes (e.g., in traditional air data probe systems) following the loss of opposite side pressure used for AOS compensation, for example. Standby probes can also benefit from the same increase in fidelity through single-probe AOS compensation. Since a single probe has the potential to calculate all necessary air data and not rely on other probes, this helps improve fault detection/isolation and minimizes the potential for common mode faults from one probe influencing the calculations of another.

Embodiments of a probe herein may utilize a single total pressure port and two AOA-sensitive static ports. In certain embodiments, beta (e.g., slip) sensitive static ports can also be included on the probe to provide additional characterization. There are locations where both AOA and AOS ports can have sensitivity to local flow conditions. While not every location provides optimum sensitivity to beta (slip) and/or alpha (angle of attack), there are locations on the aircraft that are sensitive to both. Finding locations with the proper sensitivity is much easier when trying to locate only two probes rather than the previously required four, for example.

Embodiments allow use of a single air data probe to determine all of the necessary air data parameters (e.g., Mach, AAOA, AAOS, altitude, etc.) including sideslip angle and thus perform sideslip compensation without the need for neural networks, iterative schemes, or input from inertial navigation systems. Knowledge of how the aircraft changes the local flow angles and local pressures can be used to characterize these changes with angle of attack, sideslip, and Mach number, for example. Therefore, estimations of AAOA and AAOS can be provided, which are a unique function of the air data seen by a single probe. Embodiments allow determination of sideslip angle without the use of data from any other LRU, for example. Embodiments make use of the known, fixed characterization of air data at the probe location.

Embodiments of systems and methods disclosed herein allow reduction from four total pitot static systems 101 per air data system 100 to a total of two pitot static systems 101 and still comply with FAA redundancy regulations. Embodiments of probes can be symmetrically located on each side of the aircraft, for example, and can still be configured to pneumatically or digitally average slip. Embodiments can account for AOS instead of removing it using averaging, which also allows an actual number for AOS to be provided, if desired. Embodiments can use previous data points to try to remove any ambiguity that arises (e.g., aircraft is charting similar to FIGS. 3A and 3B, then starts charting like FIG. 3C, but a known degree of AOA existed before and, the aircraft can only move so abruptly).

As will be appreciated by those skilled in the art, aspects of the present disclosure may be embodied as a system, a method, and/or a computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system," for example. A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof are contemplated herein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An air data probe system, comprising:
a pitot static system configured to sense at least one total pressure value of a flow at one or more locations, at least one static pressure value of the flow at the one or more locations, and, directly or indirectly, at least one differential static pressure value of the flow at the one or more locations; and
an angle of slip (AOS) module configured to determine a local angle of slip (LAOS) value at each location based on the at least one total pressure value at each location, the at least one static pressure value at each location, and the at least one differential static pressure value at each location, wherein the AOS module is configured to determine a local angle of attack (LAOA) value at each location based on the at least one differential pressure value at each location, or to receive an LAOA value from the pitot static system, wherein the AOS module is configured to determine the LAOS at each location based on a comparison of total pressure to static pressure ratio ($P_t/P_s$) against LAOA at a given speed, altitude, and temperature.

2. The system of claim 1, wherein the AOS module is configured to plot $P_t/P_s$ against LAOA and determine the LAOS value based on stored LAOS correlation data for the location.

3. The system of claim 1, wherein the AOS module is configured to determine an aircraft angle of slip (AAOS) based on the determined LAOS using stored AAOS correlation data.

4. The system of claim 3, wherein the AOS module is configured to determine an aircraft angle of attack (AAOA) based on the determined LAOA using stored AAOA correlation data.

5. The system of claim 4, wherein the AOS module is configured to find a point on a correlation surface plot corresponding to the determined LAOS and the AAOA to determine the AAOS.

6. The system of claim 3, wherein the AOS module is configured to output the AAOS to an aircraft airspeed and/or altitude module configured to determine airspeed and/or altitude using the AAOS or to a correct a provided airspeed and/or altitude based on the AAOS.

7. The system of claim 1, wherein AOS module is configured to determine the LAOS by:
receiving the at least one total pressure value and the at least one static pressure value from the pitot static system at each location;
receiving the at least one differential static pressure value of the flow from the pitot static system at each location or deriving the at least one differential static pressure value from a plurality of static pressure values from the pitot static system at each location;
determining a local angle of attack (LAOA) value at each location based on the at least one differential static pressure value; and
comparing total pressure to static pressure ratio ($P_t/P_s$) to the determined LAOA value to determine the LAOS value at each location based on stored LAOS correlation data for each location.

8. The system of claim 1, wherein the pitot static system includes a pitot tube having at least one total pressure port and at least two static pressure ports 180 degrees apart from each other to allow determination of differential pressure value to allow the system to determine a first local flow angle.

9. The system of claim 8, wherein the pitot tube includes at least two additional static pressure ports to allow determination of a second differential pressure value to allow the system to determine a second local flow angle.

10. A computer implemented method for determining an angle of slip, comprising:
receiving at least one total pressure and at least one static pressure value of a flow from a pitot static system at one or more locations;
receiving at least one differential static pressure value of the flow at each location from the pitot static system or deriving the differential static pressure from a plurality of static pressure values from the pitot static system at each location;
determining a local angle of attack (LAOA) value at each location based on the at least one differential static pressure value; and
comparing total pressure to static pressure ratio ($P_t/P_s$) to the determined LAOA value to determine a local angle of slip (LAOS) value at each location based on stored LAOS correlation data for each location.

11. The method of claim 10, further comprising determining an aircraft angle of slip (AAOS) based on the determined LAOS value using stored AAOS correlation data.

12. The method of claim 11, further comprising determining an aircraft angle of attack (AAOA) based on the determined LAOA value using stored AAOA correlation data.

13. The method of claim 12, further comprising finding a point on a correlation surface plot corresponding to the determined LAOS and the determined AAOA to determine the AAOS.

14. The method of claim 11, further comprising determining airspeed and/or altitude using the determined AAOS.

15. The method of claim 14, further comprising providing the determined airspeed and/or altitude to an air data computer of an aircraft.

16. The method of claim 11, further comprising correcting a provided airspeed and/or altitude based on the determined AAOS.

17. The method of claim 16, further comprising providing the corrected airspeed and/or altitude to an air data computer of an aircraft.

18. A non-transitory computer readable medium comprising computer executable instructions, the instructions configured to cause a computer to perform a method, the method comprising:
receiving at least one total pressure and at least one static pressure value of a flow from a pitot static system at one or more locations;
receiving at least one differential static pressure value of the flow at each location from the pitot static system or deriving the differential static pressure from a plurality of static pressure values from the pitot static system at each location;
determining a local angle of attack (LAOA) value at each location based on the at least one differential static pressure value; and
comparing total pressure to static pressure ratio ($P_t/P_s$) to the determined LAOA value to determine a local angle of slip (LAOS) value at each location based on stored LAOS correlation data for each location.

* * * * *